United States Patent [19]

Easter

[11] Patent Number: 4,993,678
[45] Date of Patent: Feb. 19, 1991

[54] SEAT POSITIONING MECHANISM

[75] Inventor: Robert L. Easter, Kingswood, United Kingdom

[73] Assignee: Ford Motor Company, Dearborn, Mich.

[21] Appl. No.: 422,870

[22] Filed: Oct. 17, 1989

[30] Foreign Application Priority Data

Oct. 27, 1988 [GB] United Kingdom ............... 8825087

[51] Int. Cl.⁵ ........................................... F16M 13/00
[52] U.S. Cl. ................................. 248/371; 248/421; 297/348
[58] Field of Search ............... 248/371, 393, 394, 396, 248/421, 398; 297/325, 345, 348

[56] References Cited

U.S. PATENT DOCUMENTS

| 3,314,637 | 4/1967 | Fudala | 248/421 X |
|---|---|---|---|
| 3,977,725 | 8/1976 | Tengler et al. | 248/393 X |
| 4,074,886 | 2/1978 | Yates | 248/396 X |
| 4,159,095 | 6/1979 | Pallant et al. | 248/421 X |
| 4,229,041 | 10/1980 | Werner | 248/393 X |
| 4,556,185 | 12/1985 | Takagi | 248/421 |
| 4,648,575 | 3/1987 | Kawade | 248/421 X |
| 4,648,578 | 3/1987 | Sakamoto | 248/396 X |

Primary Examiner—David L. Talbott
Attorney, Agent, or Firm—Daniel M. Stock; Roger L. May

[57] ABSTRACT

A seat height and tilt mechanism for a vehicle seat has separate hand wheel controlled adjustors for adjusting the seat height and tilt having a control lever which can be moved relative to the seat base and a system of pivoted links which results in the seat as a whole being raised or lowered, the control lever then alternatively being locked relative to the seat base, the front edge of the seat then being lifted to tilt the seat.

12 Claims, 2 Drawing Sheets

4,993,678

SEAT POSITIONING MECHANISM

BACKGROUND OF THE INVENTION

This invention relates to a seat positioning mechanism for adjusting both the height and the tilt of a seat in a motor vehicle.

Although a number of highly sophisticated seat adjustment devices are known (see for example U.S. Pat. No. 3,692,271), these have the disadvantage of over-complexity, both in manufacture and assembly and in not being user-friendly. Positioning mechanisms powered by electric motors are also known and an example of such a mechanism is shown in U.S. Pat. No. 4,632,353.

There is however a need for a mechanism of relatively simple construction which is robust, easy to operate and which is relatively cheap to manufacture and install. Further criteria are that the mechanism should not obstruct the space for the rear seat passengers feet under the front seat of the vehicle and that the mechanism should provide adequate rigidity to the seat mounting to prevent any adverse effect on the fore and aft sliding movement of the seat on its fixed slides.

SUMMARY OF THE INVENTION

According to the invention, there is provided a seat positioning mechanism for a motor vehicle which allows adjustment of both the seat height and the seat tilt, the mechanism comprising a first frame to be attached to the underside of a seat cushion, a second frame to be mounted on seat slides fixed to the vehicle floor for fore and aft movement thereon, a first adjustment device for operating the seat height adjustment, a second adjustment device for operating the seat tilt adjustment, an axle mounted on the second frame with the second adjustment device being operable to produce vertical movement of the axle relative to the second frame, a control link pivoted to the first frame and to the axle with the first adjustment device being operable to alter the angle the link makes to the first frame, and a system of pivoted links interconnecting the two frames and the axle.

Both the first and the second frame are preferably four-sided frames with two lateral members joined by two transverse members, and the pivoted links connecting one frame to the other frame at each corner. This results in considerable rigidity for the mechanism.

The adjustment devices are preferably manually operated hand wheels which act through clutch spring devices to prevent the shafts associated with their operation from turning except when the hand wheel is being turned.

The pivoted links are preferably in the form of bell crank levers and the two levers on each side are connected to one another so that they make corresponding movements without any lost motion.

The control link is preferably mounted at the front of the mechanism and incorporates one of the pivoted links at one corner of the frames. The control link preferably has a toothed quadrant which meshes with a toothed pinion on the shaft of the first adjustment device. Turning the first adjustment device therefore drives the quadrant and the control link so as to raise or lower the front of the first frame relative to the axle. Because the frames are connected by the pivoted links which are themselves interconnected, this results in the rear end of the first frame being raised or lowered an equivalent amount.

The axle preferably carries toothed pinions which are rotated by the second adjustment device and which mesh with the teeth of racks which extend vertically. With the first adjustment device locked, movement of the second adjustment device to raise or lower the axle along the vertical rack results in raising or lowering of the front edge only of the first frame.

In order to reduce the torque needed to raise the first frame with the seat, a spring arrangement can be fitted to urge the first frame in an upward direction. The spring arrangement can comprise for example a torsion bar or a coiled torsion spring.

BRIEF DESCRIPTION OF THE DRAWINGS

The invention will now be further described, by way of example, with reference to the accompanying drawings in which.

Figure 1:
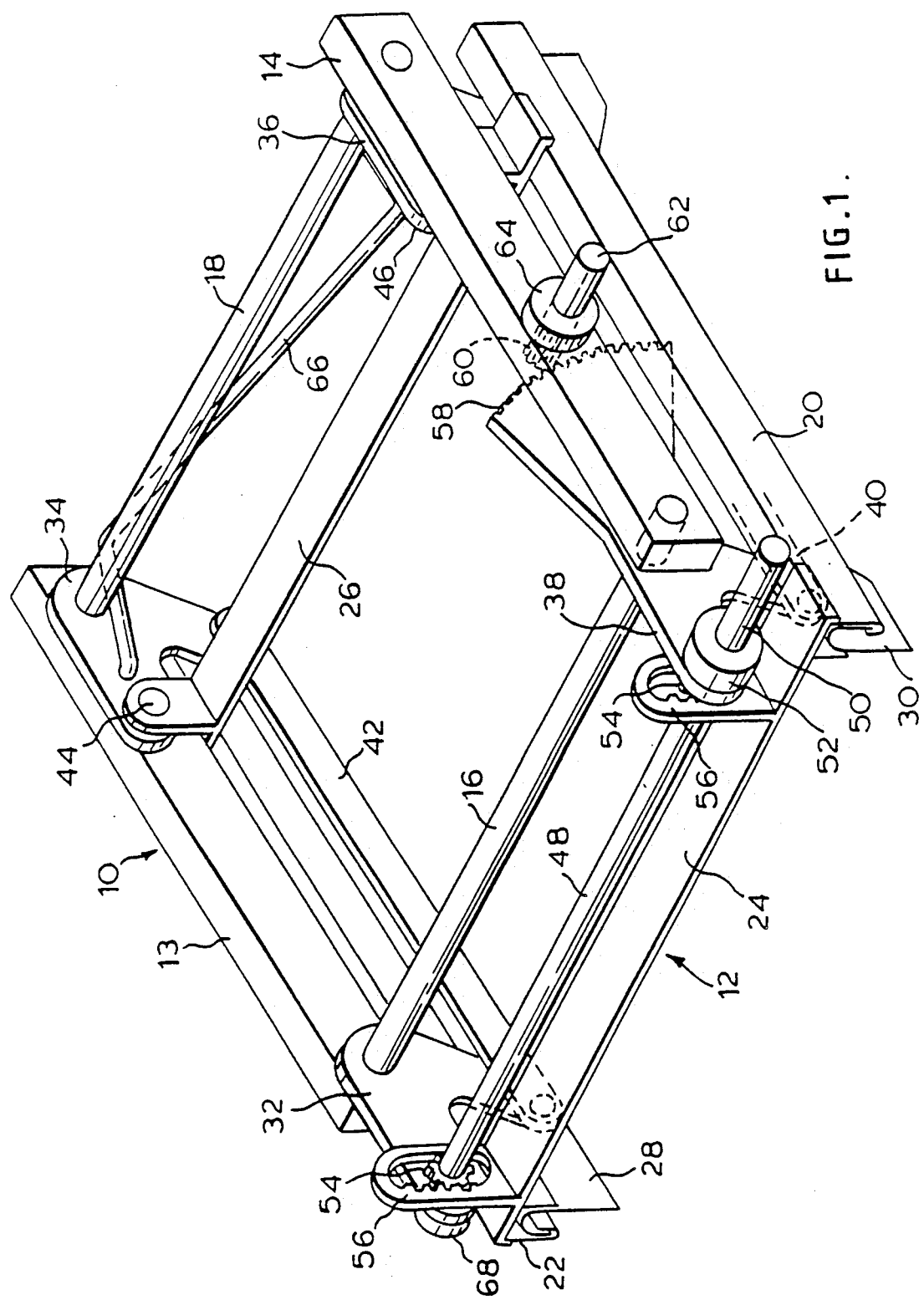
FIG. 1 is a perspective view of a positioning mechanism in accordance with the invention.

The mechanism shown in FIG. 1 comprises a first frame 10 and a second frame 12. The first frame consists of two longitudinal members 13, 14 and two transverse members 16 and 18. The base of a seat will be mounted on this frame by suitable known mounting arrangements.

The second frame consists of longitudinal members 20 and 22 joined by transverse members 24 and 26. The longitudinal members 20, 22 run on fixed tracks 28, 30 which are secured in a conventional manner (not shown) to the floor of a vehicle body, and the fore and aft sliding movement of the longitudinal members or runners 20, 22 on the tracks 28, 30 will be achieved in a conventional manner as already known to those skilled in the art.

Pivoted bellcrank levers 32, 34, 36 and 38 are mounted on the transverse bars 16, 18 of the first frame, and have one limb connected to a tie bar 40 or 42. The other limbs of the rear links 34, 36 are pivoted at 44, 46, respectively, to the transverse member 26. The forward limbs of the front links 32, 38 are pivoted on an axle 48 which spans the front end of the mechanism.

The tie bars 40, 42 interconnect the links in pairs so that movement undertaken by a front link is also transferred to the rear link.

The axle 48 has a projecting shaft end 50 on which a hand wheel may be mounted, and a spring clutch 52 is also provided. This spring clutch will be described in more detail later. Two pinions 54 are fixed on the axle 48 and are axially located so that they mesh with corresponding vertically arranged racks 56. Rotation of the shaft end 50 will cause the pinions 54 to turn relative to the racks and thus to rise up or descend down the racks.

The link 38 also forms a control link and is different from the other three links 32, 34, 36 in that it has a rearward extension which carries a toothed quadrant 58. This quadrant meshes with a toothed pinion 60 mounted on the end of a shaft 62 carried with the longitudinal member 14 of the first frame 13. A spring clutch 64 (to be described later) is also fitted on this shaft. Rotation of the shaft 62 by a hand wheel which may be mounted on it turns the pinion 60 and causes the quadrant 58 to move up or down past the position of the pinion.

In use, the shaft 62 is used to alter the height of the seat and the shaft 50 is used to alter the tilt by raising the front edge of the seat relative to the rear edge.

Considering first the case when the shaft 50 alone is turned to lift the front end of the seat, the pinion 60 will not move and as a result the relative positions of the quadrant 58 and the longitudinal member 14 will remain constant and will form a rigid arm. Lifting of the axle 48 will then cause the first frame 10 to lift at its front edge, about the axis 44, 46. This is a tilting movement.

On the other hand, when the shaft 62 is turned without the shaft 50 being turned, then the quadrant 58 will move relative to the longitudinal member 14 and the transverse member 16 will move up or down in an arc about the axis of the axle 48. The movement of the quadrant 58 will be transferred to the rear link 36 on the same side through the tie bar 40, and the links 32, 34 on the other side of the frame will follow this movement because of the rigidity of the frame 10. This is a movement which adjusts the height of the seat.

A torsion bar spring 66 has its ends supported in the links 34, 36 and is braced against the transverse member 18 so as to assist upward movement of the seat against the weight of somebody sitting in the seat.

A second spring assist unit 68 is provided on the far end of the axle 48 in the form of a coil spring which winds up as the axle is driven down the rack 56 and unwinds as the axle rides up.

The spring clutches 52, 64 are of the type which lock up to resist undesired rotation. Clutches of this type are used, for example, in window lift mechanisms. They consist of a drum 70 (FIG. 2) the internal circumferential surface of which provides a braking surface for a coil spring 72. In its normal condition the spring is compressed inside the drum and if released would want to increase its diameter. It therefore produces a frictional braking effect against the drum surface. The spring however has internally directed ends 74, 76 and the diameter of the spring is such that if these two ends are driven apart from one another in a circumferential direction, the consequent reduction in the spring diameter is sufficient to release the frictional engagement between the spring and the drum.

Figure 2:
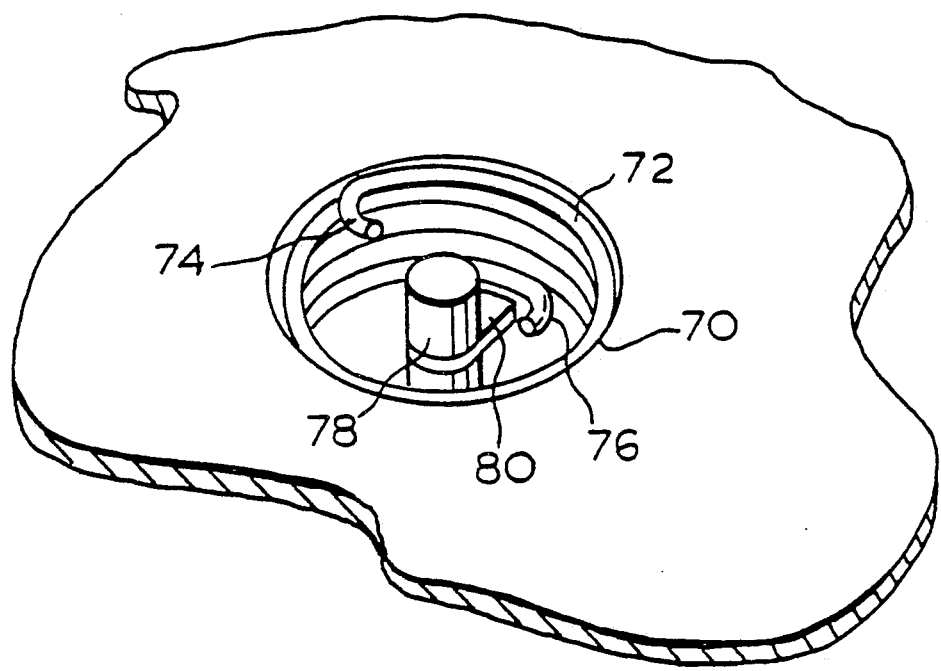
FIG. 2 is a schematic drawing of part of a spring clutch for use in the invention.

The spindle 78 shown in FIG. 2 is representative of the extension of the shaft 50 or 62 inside the clutch. An arm 80 secured to the spindle 78 engages with the end 76 of the spring, and a corresponding feature (not shown) on the shaft to be driven engages on the spring end 74. There is also a driving connection (also not shown) between the spindle 78 and the shaft to be driven, and this driving connection has sufficient lost motion to allow the spring ends 74, 76 to be driven apart before the lost motion is fully taken up. Once the lost motion is taken up, driving will commence and the spring diameter will have been contracted sufficiently to release the clutch. However as soon as the shaft 50 or 62 (or the hand wheels on those shafts) are released, the spring 72 will once again expand to lock the spindle. In this way the shafts 50 or 62 can be turned to any desired position and then released whereupon they will lock.

The mechanism shown is simple, rigid and spacesaving. Separate controls are provided for seat lift and seat tilt and the space at the underneath back of the seat is not obstructed to any great extent. As a result of the use of two full frames 10 and 12, a rigid structure is produced which will not be subject to distortion in use.

Although the mechanism has been described for use with manual control and hand wheels which are turned by the seat occupant, it would equally be possible to use electric motors to rotate the shafts 50 and 62.

What is claimed is:

1. A seat positioning mechanism for a motor vehicle having a floor and slides mounted on the floor for carrying a seat of the type having a seat cushion, the mechanism being of the type which allows adjustment of both the seat height and the seat tilt with respect to the vehicle floor, the mechanism comprising punctuation a first frame to be attached to the underside of the seat cushion;

a second frame to be mounted on the seat slides for fore and aft movement thereon;

a first adjustment device for operating the seat height adjustment;

a second adjustment device for operating the seat tilt adjustment;

an axle mounted on said second frame, said second adjustment device being rotatively operable to produce vertical movement of said axle relative to said second frame;

a control link pivotally mounted to said first frame and to said axle, said first adjustment device being operable upon pivotal movement to alter the angle said control link makes to said first frame; and a system of pivoted links interconnecting said two frames and said axle.

2. A seat positioning mechanism as defined in claim 1, wherein both said first and second frames are four-sided frames having two lateral members joined by two transverse members, said pivoted links connecting one frame to the other frame at each corner of said frames.

3. A seat positioning mechanism as defined in claim 1, wherein said adjustment devices comprise manually operated shafts operatively connected to clutch spring devices to prevent adjusting movement of said frames except when said shafts are being turned.

4. A seat positioning mechanism as defined in claim 1, wherein said pivoted links comprise bell crank levers and the two levers on each side of said frame are connected to one another so that they make corresponding movements without any lost motion.

5. A seat positioning mechanism as defined in claim 1, wherein said first adjustment device comprises a shaft having a toothed pinion carried thereon and said control link comprises a toothed quadrant meshing with said toothed pinion.

6. A seat positioning mechanism as defined in claim 5, wherein said control link is unitarily formed with one of the pivoted links.

7. A seat positioning mechanism as defined in claim 1, and further comprising vertically extending rack means positioned adjacent said axle and wherein said axle carries toothed pinions rotatively engaging said second adjustment device and meshingly engaged with teeth of said rack means.

8. A seat positioning mechanism as defined in claim 1, wherein a spring arrangement is fitted to urge the first frame in an upward direction.

9. A seat positioning mechanism as defined in claim 8, wherein the spring comprises a torsion bar.

10. A seat positioning mechanism for a motor vehicle having a floor and slides mounted on the floor for carrying a seat of the type having a seat cushion, the mechanism being of the type which allows adjustment of both the seat height and the seat tilt with respect to the vehicle floor, the mechanism comprising punctuation a first four-sided frame adapted to be attached to the underside of the seat cushion;

a second four-sided frame adapted to be mounted on the seat slides intermediate said seat slides and said first frame for fore and aft movement on said seat slides;

a first manually operable adjustment device operative to effect seat height adjustment;

a second manually operable adjustment device operative to effect seat tilt adjustment;

an axle mounted on said second frame, said second adjustment device being rotatively operable to produce vertical movement of said axle relative to said second frame;

a control link pivotally mounted to said first frame and to said axle, said first adjustment device being operable upon pivotal movement to alter the angle said control link makes to said first frame; and linkage means operatively connected between adjacent corners of said frames and interconnecting said two frames and said axle.

11. A seat positioning mechanism as defined in claim 10, wherein said first adjustment device comprises a shaft having a toothed pinion carried thereon and said control link comprises a toothed quadrant meshing with said toothed pinion.

12. A seat positioning mechanism as defined in claim 10, and further comprising vertically extending rack means positioned adjacent said axle and wherein said axle carries toothed pinions rotatively engaging said second adjustment device and meshingly engaged with teeth of said rack means.

* * * * *